(No Model.)
N. S. KEITH.
GOVERNOR FOR ELECTRIC OR OTHER MOTORS.
No. 517,866. Patented Apr. 10, 1894.
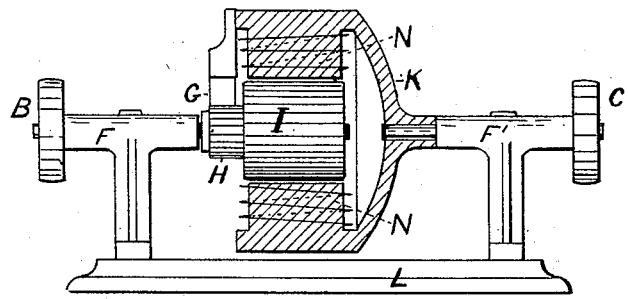
Fig. 1.
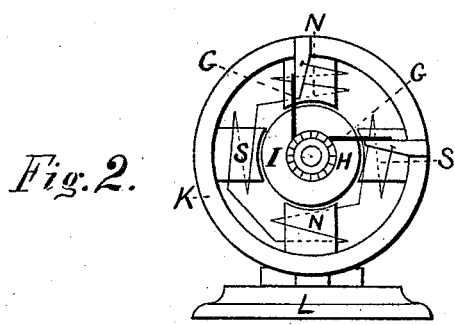
Fig. 2.
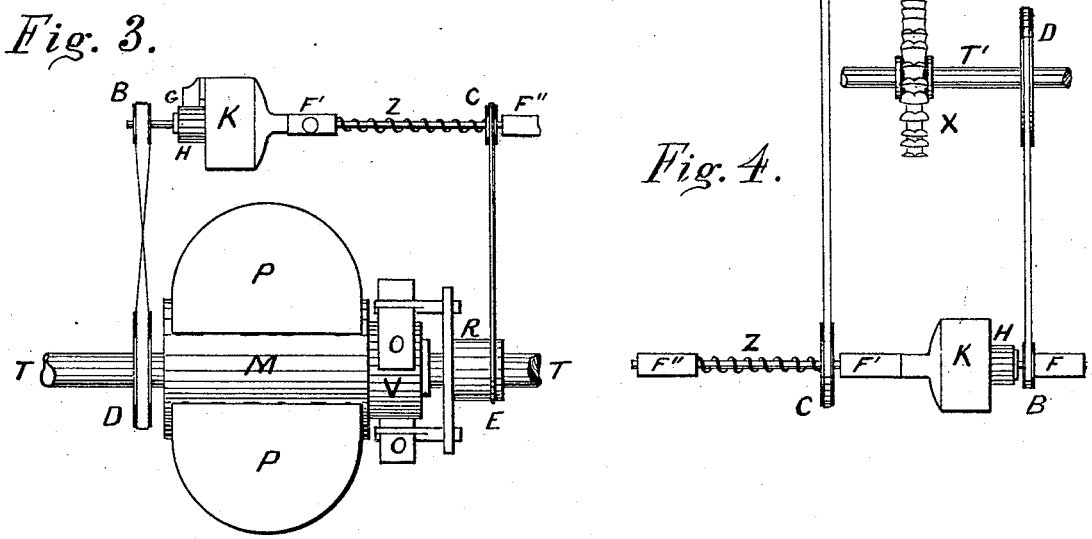
Fig. 3.
Fig. 4.
Witnesses:
N. M. Keith
A. H. Hickerson
Inventor:
N. S. Keith

UNITED STATES PATENT OFFICE.

NATHANIEL S. KEITH, OF SAN FRANCISCO, CALIFORNIA.

GOVERNOR FOR ELECTRIC OR OTHER MOTORS.

SPECIFICATION forming part of Letters Patent No. 517,866, dated April 10, 1894.

Application filed July 5, 1893. Serial No. 479,608. (No model.)

*To all whom it may concern:*

Be it known that I, NATHANIEL SHEPARD KEITH, a citizen of the United States of America, residing in the city and county of San Francisco and State of California, have invented a new and useful Improvement in Governors for Electric or other Motors; and I do hereby declare that the following is a full and exact description of the same, when taken in connection with the accompanying drawings, sufficient to enable those skilled in the art to make and use the same.

The object of my invention is to provide a sensitive governor of the speed of electric motors, steam engines, water-wheels, wind-mills, and hydraulic engines, which will work by means of an electric current generated by the movement of part of the governor itself, and which is sensitive by reason of the properties of the electric current so produced, which properties confer varying quantities of magnetism to the moving parts of the governor, so that they move in government of the speed of the motor to which it is attached, more readily than do the various types of centrifugal governors.

Figure 1 is a view, in longitudinal elevation, partly in section, of my governor, unattached to a motor. Fig. 2 is an end elevation of the same. Fig. 3 shows the governor attached to an electric motor, and Fig. 4 shows the governor attached to a tangential water-wheel, such as those of Pelton, Knight or Dodd.

In all of the figures like letters of reference refer to like parts.

Upon the base L are the standards F, F', F''. These standards serve as bearings for the shaft of the armature, I, and of the shaft of the field-magnet, K, of a dynamo-electric machine. The two shafts have their longitudinal centers on the same line, but are separately rotatable in either direction.

B is a pulley on the shaft of the armature, and C is a pulley on the shaft of the field-magnet.

N, N, S, S, are the cores and poles of the field-magnet, and between which the armature is rotated.

G, G, are the brushes, and H is the commutator.

The armature I, and the cores N, N, S, S, are suitably wound with wire, as in the case of any dynamo-electric machine. Therefore, whenever the armature is rotated it causes the generation of electric current in the wire circuits of armature and field-magnets, and by reason of the magnetism so conferred upon the parts, there is produced a torque on the field-magnet, which, if not restrained would cause the rotation of the field-magnet and its attached pulley, C. This torque increases at a rate more than the square of the increase of speed:—perhaps even at the rate of the cube of the increase of speed. When the speed of rotation of the armature is decreased the torque decreases in inverse ratio to that of its increase. It is plain, then, that if the armature be rotated by any kind of a motor, electric, steam, air, or water, and the field-magnet be suitably connected to the brushes, or switch, or rheostat, which controls the admission of electric energy to the electric motor, or to the parts thereof; or be connected to the throttle, or other valve of a steam-engine; or be connected to the valve, cock, or gate of a water-motor, or water-wheel; the combination will act to control the admission of electricity, or steam, or water to their appropriate motors, so as to keep such motors running at approximately a constant rate of rotation. This speed may be predetermined by making the controlling spring Z, Figs. 3 and 4, more or less strong.

I will describe the operation of my governor on an electric motor of the constant-current type; and also on a water-motor; after which description its application to, and operation on any steam, air, water, or electric motor, of other types, will be plain and obvious.

In Fig. 3, T, is the shaft of a constant-current electric motor, which is controlled by the movement of its brushes. P, P are the poles of its field-magnet; M is its armature; V is its commutator: and O, O its brushes. R is the hub of the yoke which carries the brush-holder and the brushes. R is rotatable on a support concentric with the shaft. When the shaft of the motor rotates it rotates the shaft of the armature of the governor through the agency of the cross-belt on the pulleys D, and B. This tends to make the field-magnet, K, of the governor rotate in the same direction as the governor armature, but does not do so until the armature is rotated fast enough so that its torque on K becomes enough to twist the spring, Z; when K will move, and with it the pulley C, and the cord, or belt, which extends from C to R at E; and consequently the hub, R, of the yoke, and its attached brushes. The brushes, O, O, are thus moved backward on the commutator, where they convey electric current to and from the armature at a less favorable position for the torque of the motor. Any slight increase of speed will be followed by a corresponding further backward movement of the brushes. Any decrease of speed will be followed by a corresponding forward movement by reason of the action of the spring, Z, of the brushes, O, O, to a more favorable position on the commutator, V, with a corresponding increase of speed.

In Fig. 4, X represents a tangential water-wheel, or water-motor, such as the Pelton, Knight, or Dodd, mounted on the shaft T'. U is the water pipe; W is a valve to control the flow of water; and Y is the nozzle. The governor is connected to the water-wheel by the belt to the armature from the pulley D to the pulley B, and from the field-magnet by the belt from the pulley C to the pulley E' on the stem of the valve W. Any rotary movement of K will communicate the appropriate movement to the stem of the valve, W, to turn off or on, more, or less, water, as the necessities of regulation of speed may require. This rotary movement of K will be produced by varying speeds of the water-wheel communicating varying speeds to the armature of the governor, and consequently varying torque effects on the field-magnet, K. This governor may be attached in obvious ways to any motor, to keep its speed of movement at approximately a constant rate.

I have shown four magnet cores and poles on the field-magnet; because such a form is more readily balanced in its weight and mechanism. Two, six, or more poles may be used if desirable. I have shown a spring, Z, the use of which is to move K backward whenever the torque is small enough to allow of such a movement, as in the case of too low a speed of rotation. One end of the spring, Z, is fastened to the bearing F', Fig. 3, or to F'', Fig. 4, and the other end the pulley, C, in both figures. By making the spring long, and with many convolutions, the changes of speed will be less in revolutions than if the spring be short and of few convolutions. By using a weight attached to a cord wound upon the shaft of K, in place of the spring, Z, to counteract the torque on K the ratio of change will be still less. It is evident that the counteracting spring, or weight may be placed in other places than on the shaft of the field-magnet; as, for instance, on the hub, R, Fig. 3, or the stem of the valve, W.

I do not confine my invention to the exact forms shown and described. It is evident that many mechanical ways of connecting and associating the parts may be adopted to suit the various circumstances, either with or against the motion of the armature the relative positions of the brushes to the field-magnet, and armature, do not change; so that under the same strength of current in the armature and field-magnet coils there is always the same torque. Any tendency for the field-magnet to turn too quickly, or too far, in movement of the brushes, switches, valves, or other controlling mechanisms, is counteracted by the fact, that, as the field-magnet rotates in the direction of the rotation of the armature the relative speed of the armature to that of the field-magnet is decreased; and therefore there is a corresponding decrease in the current, magnetism, and torque. So the field-magnet cannot turn too fast, and is ready to stop with the least decrease in speed of the armature. If the field-magnet turns the other way, then the relative speed of the armature to it is increased, with a corresponding increase in current, magnetism, and torque. So it is evident that the field-magnet cannot turn too fast nor too far in the reverse direction. Racing, a too common defect in governors, is thus prevented.

This governor can be attached to the levers of rheostats and switches of various controlling mechanisms of electric motors in obvious ways.

Having described my invention, I claim—

1. A governor of the speed of an electric, a steam, or a water motor, consisting of a dynamo-electric machine having its armature driven by the motor; its field-magnet mounted so as to be rotatable in one direction by the magnetic torque of its armature on its field-magnet; and rotatable in the other direction by a spring, or weight, or like means; and attached by suitable mechanism to means which control the supply of either electricity, magnetism, steam, water, or air to the motor, or parts thereof.

2. A governor of the speed of any motor:—consisting of a dynamo-electric machine, having its armature driven by the motor; its field-magnet mounted so as to rotate in one direction by reason of the magnetic torque of its armature on its field-magnet; and so as to rotate in the other direction by the pull of a spring, or weight, or analogous means; and said field-magnet attached by suitable mechanism to means which control the supply of energy to the motor, or parts thereof, so that the movements of the field-magnet of the governor effects automatically the supply of energy to the motor to preserve an approximate constancy of speed.

3. The combination which consists of a motor; means for regulating the supply of actuating materials or energy to the motor; a dynamo-electric machine mounted so as to rotate concentrically to or fro, with its armature; means for rotating the armature of the dynamo-electric machine by the motor; a device, or devices, for connecting the field-magnet to the means for regulating the supply of actuating materials, or energy, to the motor; all so that when the field-magnet is rotated a corresponding motion is conveyed to the aforesaid means for regulating the supply of actuating materials, or energy, to the motor.

In witness whereof I hereunto sign my name this 31st day of January, 1893.

N. S. KEITH.

Witnesses:
    LEE D. CRAIG,
    A. G. WALSH.